United States Patent [19]

McLean, II et al.

[11] Patent Number: 5,698,173
[45] Date of Patent: Dec. 16, 1997

[54] PURIFICATION OF URANIUM ALLOYS BY DIFFERENTIAL SOLUBILITY OF OXIDES AND PRODUCTION OF PURIFIED FUEL PRECURSORS

[75] Inventors: William McLean, II, Oakland; Philip E. Miller, Livermore, both of Calif.

[73] Assignee: The United States of America as represented by the United States Department of Energy, Washington, D.C.

[21] Appl. No.: 675,327

[22] Filed: Jun. 21, 1996

[51] Int. Cl.[6] .................................................. C01G 43/00
[52] U.S. Cl. ........................... 423/253; 423/260; 252/643; 264/0.5
[58] Field of Search ............................ 252/643; 423/8, 423/10, 18, 260, 261, 253; 264/0.5

[56] References Cited

U.S. PATENT DOCUMENTS

| | | | |
|---|---|---|---|
| 4,225,455 | 9/1980 | Haas | 588/18 |
| 4,255,392 | 3/1981 | Chiang | 423/11 |
| 4,436,704 | 3/1984 | Krennrich et al. | 423/11 |
| 4,466,944 | 8/1984 | Dennis | 423/6 |
| 4,656,015 | 4/1987 | Divins et al. | 423/261 |
| 5,000,927 | 3/1991 | Babb et al. | 423/10 |
| 5,015,422 | 5/1991 | Yato et al. | 264/0.5 |
| 5,139,709 | 8/1992 | Huang et al. | 264/5 |
| 5,384,104 | 1/1995 | Noe | 423/15 |
| 5,417,943 | 5/1995 | Braehler et al. | 423/2 |
| 5,514,306 | 5/1996 | Larson et al. | 264/0.5 |

*Primary Examiner*—Charles T. Jordan
*Assistant Examiner*—John R. Hardee
*Attorney, Agent, or Firm*—Townsend and Townsend and Crew LLP

[57] ABSTRACT

A method for purifying metallic alloys of uranium for use as nuclear reactor fuels in which the metal alloy is first converted to an oxide and then dissolved in nitric acid. Initial removal of metal oxide impurities not soluble in nitric acid is accomplished by filtration or other physical means. Further purification can be accomplished by carbonate leaching of uranyl ions from the partially purified solution or using traditional methods such as solvent extraction.

14 Claims, 3 Drawing Sheets

PURIFICATION OF URANIUM ALLOYS BY DIFFERENTIAL SOLUBILITY OF OXIDES AND PRODUCTION OF PURIFIED FUEL PRECURSORS

STATEMENT OF GOVERNMENT INTEREST

The U.S. Government has certain rights to this invention under Contract No. W-7405-ENG-48 between the University of California and the U.S. Department of Energy.

BACKGROUND OF THE INVENTION

Current production of nuclear reactor fuel is based on conversion of gaseous $UF_6$ to fuel precursors such as uranyl nitrate $[UO_2(NO_3)_2 \cdot 6H_2O]$ hereinafter referred to as UNH, ammonium diuranate $[(NH_4)_2U_2O_7]$ hereinafter referred to as ADU, ammonium uranyl tricarbonate $[(NH_4)_4UO_2(CO_3)_3]$ hereinafter referred to as AUC, or uranium trioxide $[UO_3]$. However, in the future metallic sources of fuel grade uranium will become available. One potential source of enriched uranium metal is the Uranium Atomic Vapor Laser Isotope Separation (U-AVLIS) process where the metal is produced as a low melting point alloy containing nominally 10 weight % iron. Another source of enriched uranium metal could be derived from surplus nuclear weapons components that may or may not contain alloying materials.

The most straight-forward method for processing impure uranium metal is direct acid dissolution followed by chemical purification by solvent extraction (e.g., agitation of aqueous uranium solutions with a hydrophobic mixture of tributyl phosphate and kerosene, followed by removal of the organic phase). While solvent extraction is effective, it has a number of potential drawbacks which include the use of flammable solvents and the generation of mixed (i.e., hazardous/radioactive) waste. Furthermore, the solvent extraction process produces liquid rather than solid waste. Liquid wastes are generally more difficult and more expensive to dispose of. Such wet chemistry preparation processes result in a number of acceptable fuel precursors based on UNH, ADU, or AUC which, when calcined, form uranium trioxide. Final production steps for nuclear reactor fuels involve the reduction of uranium trioxide from any of these precursors to uranium dioxide which is then sintered into a ceramic form suitable for reactor use.

SUMMARY OF THE INVENTION

The present invention concerns a method for converting uranium alloys into purified uranium solutions suitable for nuclear reactor fuel production by first oxidizing the alloy and then exploiting the solubility differences between uranium oxides and the oxides of a variety of refractory and transition metals in nitric acid solutions.

An object of this invention is to produce purified uranium compounds suitable for subsequent conversion to nuclear reactor fuels while producing a minimum of by-products detrimental to the environment.

Another object of this invention is to convert purified uranium solutions to acceptable fuel precursors.

A further object of this invention is the elimination of alloying elements and impurities from the uranium solution by removal of insoluble oxides and/or hydroxides of refractory or transition metals in concert with a variety of steps including, but not limited to, pH adjustment of the uranium solution, conversion of the dissolved uranium to ADU or AUC, filtration, centrifugation, or solvent extraction.

In accordance with the first aspect of this invention, uranium alloys are converted to their oxide form at high temperatures (250° C. or higher). The assembly used for such an oxidation can comprise or consist of, but is not limited to, a fluidized bed oxidizer, a high temperature rotary kiln, or a high temperature oven. The oxidizer is operated in a manner consistent with producing metal oxides where the metal is in its highest possible oxidation state. To maximize the mass throughput rate, while minimizing the size of the physical plant, the fluidized bed system is preferred.

In accordance with the second aspect of this invention, the mixture of uranium oxide ($U_3O_8$ for oxidation temperatures above 250° C.) and refractory and/or transition metal oxides is dissolved in nitric acid. The uranium oxides rapidly dissolve to form UNH. However, many refractory and transition metal oxides, such as the $Fe_2O_3$ produced by high temperature oxidation of the U-AVLIS product alloy, remain as solids because of their limited solubility in nitric acid. These undissolved solids can be removed by settling, filtration, centrifugation, or by any combination thereof.

Further purification can be realized by adjusting the pH of the uranium solution with appropriate buffering solutions and/or caustics. The buffering solution preferably contains the carbonate anion. The carbonate anion may be added as carbonic acid (i.e., as $CO_2$), or as carbonate or bicarbonate salts or any combination thereof. To avoid the addition of metallic impurities to the uranium bearing solution, the preferred carbonate or bicarbonate salts are those containing the ammonium cation (i.e. $(NH_4)_2CO_3$ or $NH_4HCO_3$). Likewise, the caustic is preferably ammonium hydroxide. By addition of sufficient carbonate ions to the uranium solution it is possible to complex the uranyl ion $[UO_2^{++}]$ as AUC. The solubility of many refractory or transition metal oxides and hydroxides is extremely low in such solutions having elevated pHs. It is therefore possible to remove the impurities from the uranium bearing solutions by utilizing any of the above-mentioned filtering processes.

Final purification (or polishing) can be realized following the removal of solids by subjecting the uranium solution to a standard solvent extraction process.

DETAILED DESCRIPTION OF THE PREFERRED EMBODIMENTS

Figure 1:
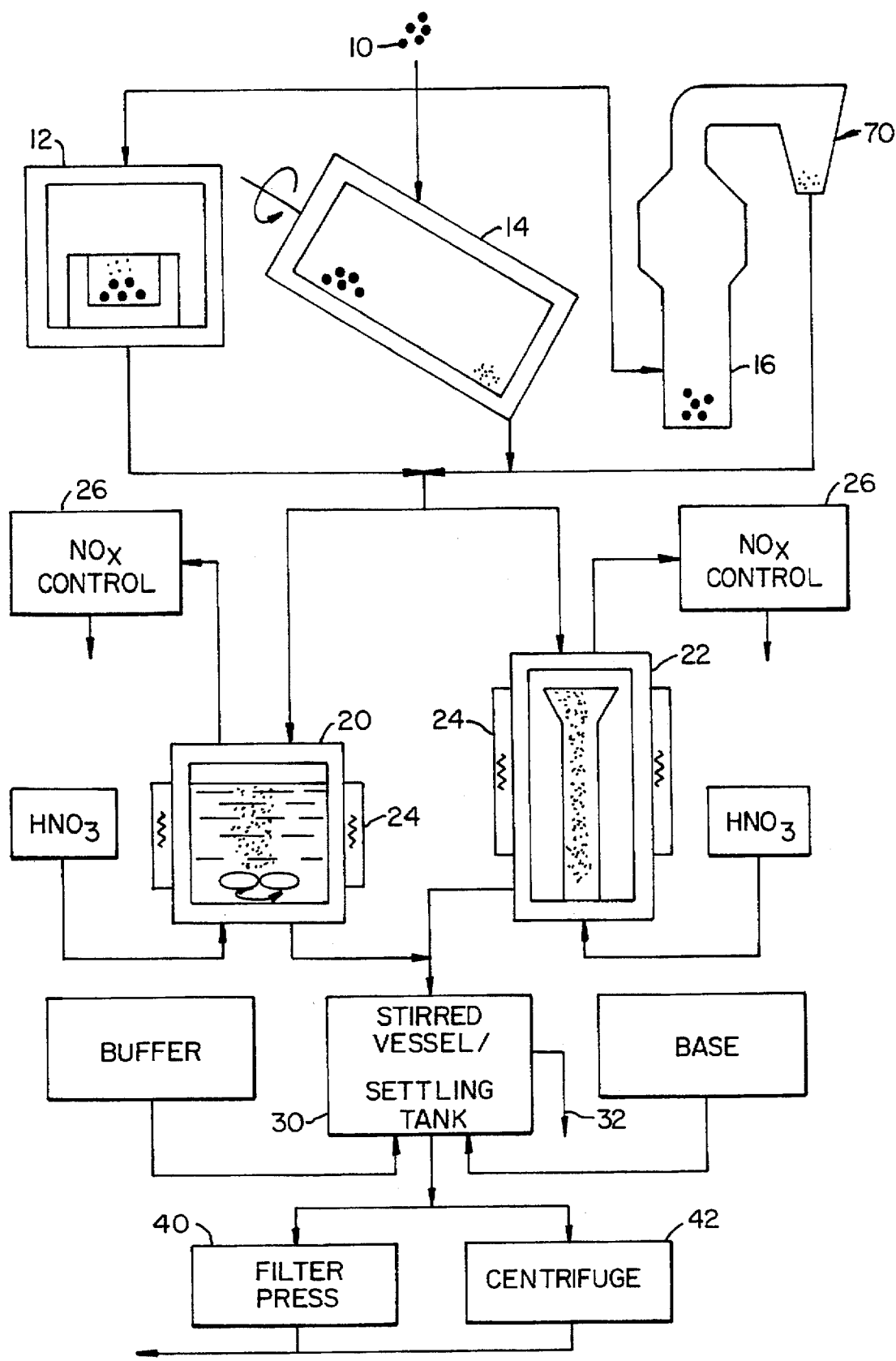
FIG. 1 is a schematic overview of an integrated process utilizing differential solubility in nitric acid ($HNO_3$) followed by pH adjustment or conversion of the dissolved uranium to AUC, gross solids removal, and, if needed, solvent extraction to achieve the desired purity levels in the uranium process stream.

FIG. 1 illustrates a uranium alloy purification process using differential solubility in accordance with the present invention. Generally, uranium alloy pellets 10 are fed into an oxidizer where the alloy is burned to form $U_3O_8$ and other metal oxides. One source of uranium alloy could be the uranium-iron alloy produced by the U-AVLIS process. However, alloys containing enriched uranium could also be derived from retired nuclear explosives. An additional source of enriched uranium alloy is contained in "scrap" inventories of alloys developed for nuclear weapons and test reactors, but which are no longer being used for their original purposes.

The oxidizer can be an oven 12 filled with containers for holding uranium alloy pellets 10 that is heated in any oxygen containing gas at high temperatures. The oxidation temperature determines the total residence time in the oven and is preferably above 250° C. but below the melting point of the alloy in process. At temperatures above 400° C. the oxidation reaction becomes self sustaining. The initial oxidation of uranium alloys proceeds by the formation of a layer of $UO_2$ on the metal surface. As oxidation continues the $UO_2$ is converted to $U_3O_8$. The ratio of the volume of oxide to the volume of metal is approximately 3:1 which results in the build-up of internal compressive stresses on the order of $3 \times 10^5$ psi in the oxide film. Such high stresses cause the $U_3O_8$ to spall away from the metal substrate when oxide thicknesses on the order of 0.1 µm are reached. A loosely packed layer of oxide accumulates around the uranium alloy pellets and inhibits oxygen access to the metal as needed to complete the oxidation reaction. When the reaction is thus inhibited, periodic stirring or shaking of the container to expose the unreacted metal will allow the reaction to proceed.

To speed up the oxidation process and assure completion of the reaction, a rotary kiln 14 can be used as the oxidizer. The physical action provided by the constant rotation of the kiln 14 leads to abrading of the uranium alloy pellets 10 against one another, which results in continuous exposure of fresh metal surfaces to the oxidizing atmosphere and thus lowers reaction times. As with the oven 12, the oxidizing atmosphere within the kiln 14 can be any oxygen-containing gas.

Figure 2:
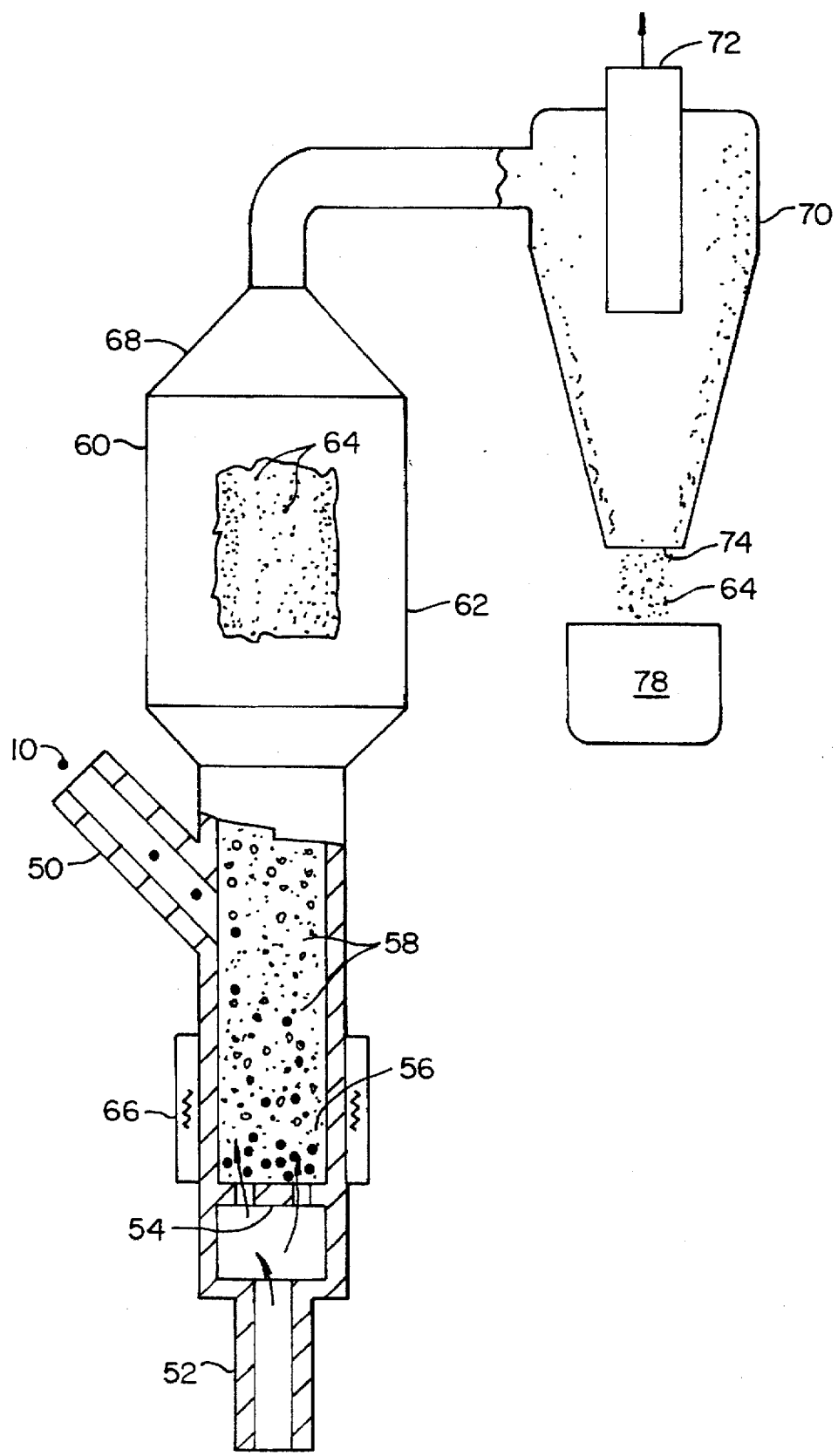
FIG. 2 illustrates one embodiment of a fluidized bed oxidizer for uranium or uranium alloys operating in a continuous throughput mode.

Another suitable oxidation means is the fluidized bed oxidizer system 16. An example of a continuous throughput fluidized bed oxidizer is shown in greater detail in FIG. 2. The two major subsystems in this columnar device are the heated reaction zone (elements 50 through 58) for converting metal to oxide, and the pneumatic transport system (elements 60 through 78) for entraining, separating and collecting finely divided uranium oxide particles.

In this continuous process example, uranium alloy pellets 10 are introduced through a feeder 50 at a predetermined rate. Fresh oxidizer (typically a nitrogen-oxygen mixture) is introduced through inlet 52 under pressure at the bottom of a diffuser plate 54 with multiple small orifices designed in such a way as to produce high gas flow velocities in the lower portion of the column 56. The high gas velocities in the lower portion of the column 56 entrain coarse oxide particles 58 below a critical size and propel them into an expansion section 60 where the diameter of the column is increased in upper column 62. The increased diameter of the upper column 62 causes the gas velocity to fall such that only fine oxide particles 64 can remain entrained at the top of the upper column 62. The abrasive action provided by the coarse oxide particles 58 against the uranium alloy pellets 10 in the lower column 56 causes fresh metal to be constantly exposed to the oxidizing gas. This, in combination with the high velocity of oxidizer exiting the diffuser plate 54, assures that oxidation is rapid and complete. The oxidation reaction is controlled by adjusting the temperature in the lower portion of the column 56 by means of a surrounding heater 66. A compression section 68 reduces the column diameter to a size such that the gas velocity is increased sufficiently to assure efficient operation of a conventional cyclone separator 70 where the entrained fine oxide particles 64 are separated from the oxidizer gas stream. Exhaust gas is vented through a port 72 in the cyclone 70 and fine oxide particles 64 are withdrawn at the bottom of the cyclone 74 and collected in a removable container 78.

A fluidized bed system 16 offers several advantages over the static oven 12 and the rotary kiln 14 in that it offers, in a compact device, a rapid oxidation path with no moving parts and an interior that is inherently smooth (and therefore easy to clean). However, any of these devices can be effectively operated so long as the temperature, oxidizing gas mixture, and oxidizing gas flow rate are adjusted to assure complete conversion of all metal components to their most highly oxidized state.

Referring again to FIG. 1, the oxide produced by the oxidizer is then dissolved in nitric acid in a stirred tank 20 or counter-current dissolver 22 maintained at the optimum temperature for dissolution by heaters 24. The dissolution rate of $U_3O_8$ particles increases both with acid molarity and with the temperature of the acid bath.

One of the major benefits of converting the uranium alloy pellets 10 to fine oxide particles 64 is that the dissolution of uranium oxide in nitric acid requires much smaller quantities of acid and produces much smaller quantities of nitrous oxides than direct dissolution of the metal. This is illustrated by the following equations for dissolving uranium metal (equation 1) and $U_3O_8$ (equation 2).

$$U + 4HNO_3 \rightarrow UO_2(NO_3)_2 + 2NO + 2H_2O \qquad \text{(eq. 1)}$$

$$\tfrac{1}{3} U_3O_8 + \tfrac{20}{9} HNO_3 \rightarrow UO_2(NO_3)_2 + \tfrac{2}{9} NO + \tfrac{10}{9} H_2O \qquad \text{(eq. 2)}$$

In the above reactions, $NO_x$ is subsequently produced by incomplete reaction of the NO in air as shown by eq. 3:

$$NO + O_2 \rightarrow NO_2 + \tfrac{1}{2} O_2 \qquad \text{(eq. 3)}$$

By dissolving uranium oxide instead of metal alloy, nitric acid consumption is reduced by 56% per mole of uranium, while NO production is reduced by 89%. Reduced $NO_x$ production significantly reduces the requirements placed on the $NO_x$ abatement system 26.

The high surface area of the fine oxide particles 64 also makes the effective dissolution rate considerably more rapid than for metal pellets 10. In addition, the heat released by the reaction of eq. 2 is 19 kcal/mole U whereas that released by eq. 1 is 238 kcal/mole U. The lower heat release for oxide dissolution means that the surrounding solution will be heated less and the dissolution reaction will be more easily controlled when dissolving oxide.

An optional treatment step following the dissolution process is to modify the pH of the solution by addition of a strong base, or a combination of a strong base and a buffer. The buffer preferably contains the carbonate anion, which can be added as carbonic acid (i.e., as $CO_2$), or as carbonate or bicarbonate salts or any combination thereof. To avoid the addition of metallic impurities to the solution containing the uranium, the preferred carbonate or bicarbonate salts are those which contain the ammonium cation (i.e. $(NH_4)_2CO_3$ or $NH_4HCO_3$). Similarly, the preferred the caustic is ammonium hydroxide. This optional step allows the uranium to be complexed by the carbonate while the solubility of some refractory and transition metal oxides and hydroxides, such as those of iron, is dramatically lowered. In addition the higher pH solutions are easier and safer to handle and contain. Modification of pH would occur in a separate stirred vessel 30.

Alternatively, in addition to modifying pH, one can continue to add ammonium and carbonate salts to the stirred vessel 30 described above until the uranyl ions are completely converted to AUC.

Following the dissolution (and optional pH modification and/or AUC production) step(s), insoluble oxides and other impurities are removed. For example, by way of illustration and not limitation, non uranium solids can be removed by actively pumping the solution through a filter press 40 or a centrifuge 42. Alternatively, the stirred vessel 30 could also serve as a settling tank if operated in parallel with a second unit. When operated as a settling tank, the vessel would be equipped with a liquid withdrawal system 32 placed at a level above the settled, precipitated solids in such a way as to allow decantation of a semi-pure uranium solution. Undissolved non-uranium solids that may be removed include iron, iron oxide, iron hydroxide, refractory metals and refractory and transition metal oxides and hydroxides. The degree of purity can be objectively determined using ASTM Standard No. C753.

Figure 3:
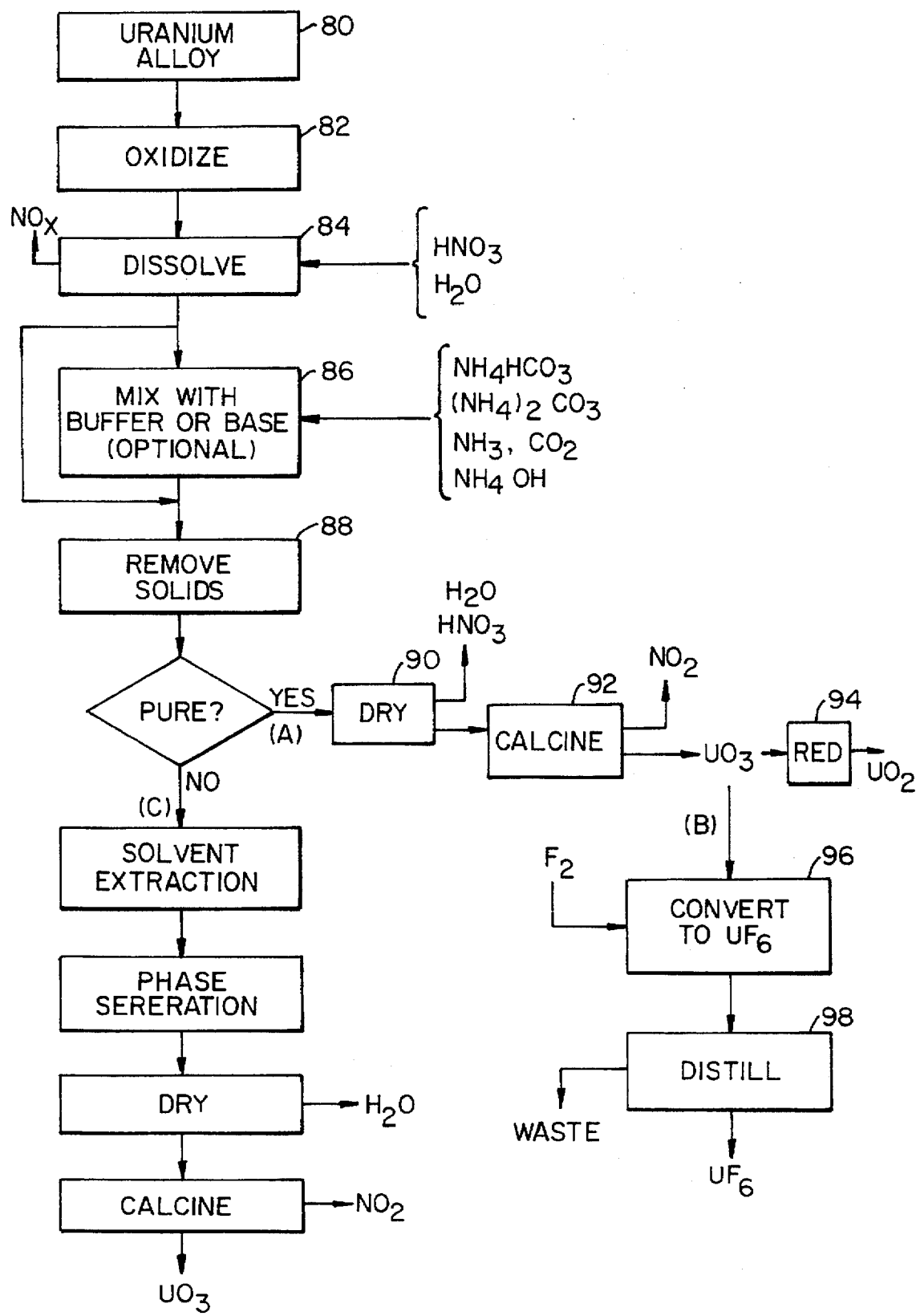
FIG. 3 is a flow diagram illustrating several alternate processes of the present invention.

If the level of impurities in the filtered uranyl nitrate stream is low enough for its intended purpose, the purification process of the invention may be terminated at this point. As illustrated in FIG. 3, Blocks 80, 82, 84, 86 and 88 illustrate the solid removal process of FIG. 1. The purified uranyl nitrate solution may be further processed in a standard fuel fabrication process as shown in path (A) wherein the uranyl nitrate may be dried and calcined to $UO_3$ as shown in blocks 90 and 92, respectively, and then reduced in block 94 to $UO_2$, which is suitable for fuel fabrication.

However, if a further reduction in the level of impurities is desired, options for subsequent processing of the purified uranyl nitrate solution are illustrated in path (B) and path (C) of FIG. 3. As illustrated in path (B), the impure oxide ($UO_3$) produced by process of path (A) may be converted to $UF_6$ by the addition of $F_2$ in block 96 and distilled in the gaseous state in block 98 to provide a more purified product. In a second option illustrated in path (C) of FIG. 3, impurities in the uranyl nitrate can be reduced by conventional solvent extraction processing prior to processing in a standard fuel fabrication process.

The apparatus of the present invention includes an oxidizer for converting uranium alloys to finely divided metal oxides; one or more dissolvers for producing an aqueous solution of uranyl nitrate; and a filtration system for removing undissolved solids. The components of the oxidizer, dissolver, and filtration system may each be operated in parallel. The apparatus may be operated in either a batch or continuous throughput mode. The oxidizer may, for example, be either a fluidized bed, a rotary kiln, or a furnace. The dissolver may, for example, be either a heated tank or a heated counter current dissolver. The filtration device may, for example, be either a settling tank, filter press, or centrifuge.

In another aspect of this invention, further purification can be accomplished by means of the techniques described above including, but not limited to, solvent extraction or conversion to $UF_6$ followed by distillation of the $UF_6$.

EXAMPLE 1

Uranium alloys containing nominally 10 wt. % iron were produced using the U-AVLIS process. Following oxidation in a crucible in an air-filled furnace, the oxide was dissolved in hot (85° C.) nitric acid solution at approximately 10 molar concentration. A considerable amount of reddish brown sludge, subsequently identified as $Fe_2O_3$, was observed. The sludge was removed by passing the solution through a series of progressively finer polycarbonate filter membranes. The majority of sludge material was removed with 12 μm filters, but some impurities were captured at the 0.5 μm level. The final Fe concentration in the clarified solution was found to range from 3 to 20 mg of iron per gram of uranium. In addition to $Fe_2O_3$ the insoluble fraction was found to contain trace levels of oxides of other transition metals and 0.75–1.0 wt. % uranium. Based on a nominal 10 wt. % iron in the original alloy, more than 99.9% of the uranium was recovered as soluble nitrates.

Following the initial phase separation and clarification of the uranyl nitrate solution, it was possible to rinse the insoluble fraction with aqueous solutions containing carbonate ions to suppress Fe solubility while removing additional uranyl nitrate trapped in the $Fe_2O_3$ matrix. This further increased the uranium recovery and, more importantly, reduced the level of uranium contained in the waste stream.

EXAMPLE 2

Further purification was accomplished by converting the UNH produced in accordance with Example 1 to a solution of AUC. An excess of ammonium bicarbonate was added to uranyl nitrate and the resulting solution was centrifuged to precipitate insolubles. Although AUC is moderately soluble (e.g., 40 g/l at 50° C.), Fe and many other transition metals are not soluble. Solids were removed by centrifugation. Purified AUC was recovered by evaporation of the excess liquid. $UO_3$ was then produced by thermal decomposition at 300° C. The iron content was reduced to less than 200 ppm, while total content of all other impurities was less than 10 ppm.

What is claimed is:

1. A method for converting uranium alloy into a fuel precursor comprising the steps of:
   a) oxidizing said alloy to form a mixture of metal oxides;
   b) selectively dissolving said mixture of metal oxides in an acid solution;
   c) removing non-uranium solids from said solution by settling, filtration, centrifugation, or a combination thereof; and
   d) isolating uranium compounds from said solution to form at least one fuel precursor.

2. The method of claim 1 wherein said alloy is oxidized at a temperature above 250° C. but below a melting point of the alloy.

3. The method of claim 1 wherein said acid solution is nitric acid.

4. The method of claim 1 wherein a pH of said acid solution is raised prior to said removing step, said pH being raised by addition of a buffer, wherein said raised pH is less than or equal to 7.0.

5. The method of claim 4 wherein said acid solution is subjected to solvent extraction to further remove non-uranium solids prior to isolating uranium compounds, said solvent extraction occurring after said addition of said buffer.

6. The method of claim 4 wherein said buffer is selected from the group consisting of $(NH_4)_2CO_3$, $(NH_4)HCO_3$, ammonia gas ($NH_3$), carbon dioxide gas ($CO_2$), and combinations thereof.

7. The method of claim 1 further comprising the step of modifying a pH of said acid solution by the addition of a suitable base prior to removal of said non-uranium solids, wherein said modified pH is less than or equal to 7.0.

8. The method of claim 6 wherein said base includes $NH_4OH$.

9. The method of claim 7 wherein said acid solution is subjected to solvent extraction to further remove non-uranium solids prior to isolating uranium compounds, said solvent extraction occurring after said addition of said base.

10. The method of claim 1 wherein said fuel precursor is selected from the group consisting of uranyl nitrate, ammonium uranyl tricarbonate, ammonium diuranate and uranium trioxide.

11. The method of claim 1 wherein said acid solution is subjected to solvent extraction to further remove non-uranium solids prior to isolating uranium compounds.

12. The method of claim 1 wherein said uranium alloy is comprised of uranium and at least one other metal, wherein said other metal is selected from the group consisting of iron and other refractory metals.

13. The method of claim 1 wherein said non-uranium solids are selected from the group consisting of iron, iron oxide, refractory metals, and refractory metal oxides.

14. The method of claim 1 further comprising the step of modifying a pH of said acid solution by the addition of a combination of a buffer and a base prior to removal of said non-uranium solids, wherein said modified pH is less than or equal to 7.0.

* * * * *